July 19, 1949.

L. L. SALFISBERG 2,476,629

POWER OPERATED HYDRAULIC SEALING AND CRIMPING MACHINE

Filed May 17, 1945

INVENTOR.
Leroy L. Salfisberg,
BY
Harry B. Cook.
ATTORNEY

July 19, 1949.
L. L. SALFISBERG
2,476,629
POWER OPERATED HYDRAULIC SEALING AND CRIMPING MACHINE
Filed May 17, 1945
3 Sheets-Sheet 2
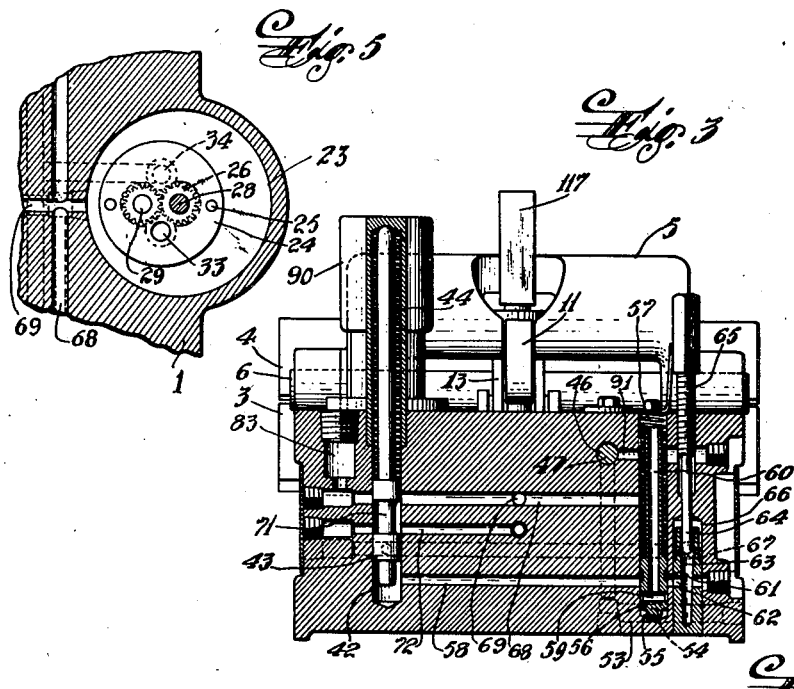
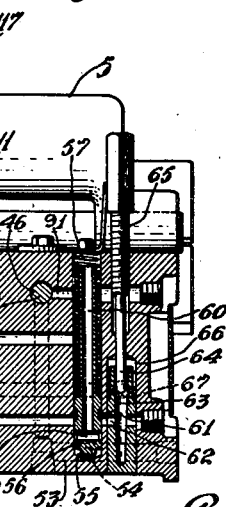
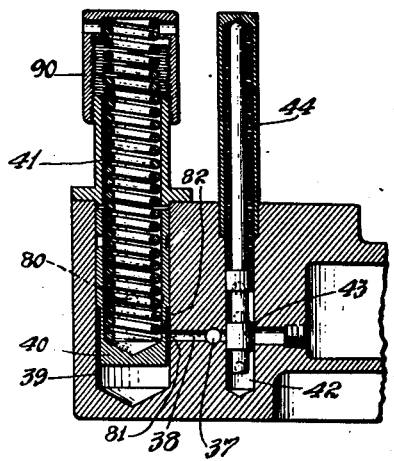
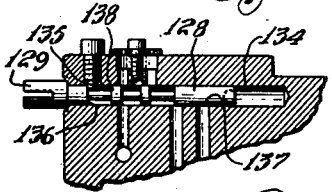
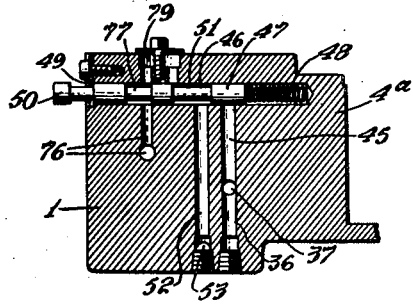
INVENTOR.
Leroy L. Salfisberg,
BY
Harry R. Cook,
ATTORNEY

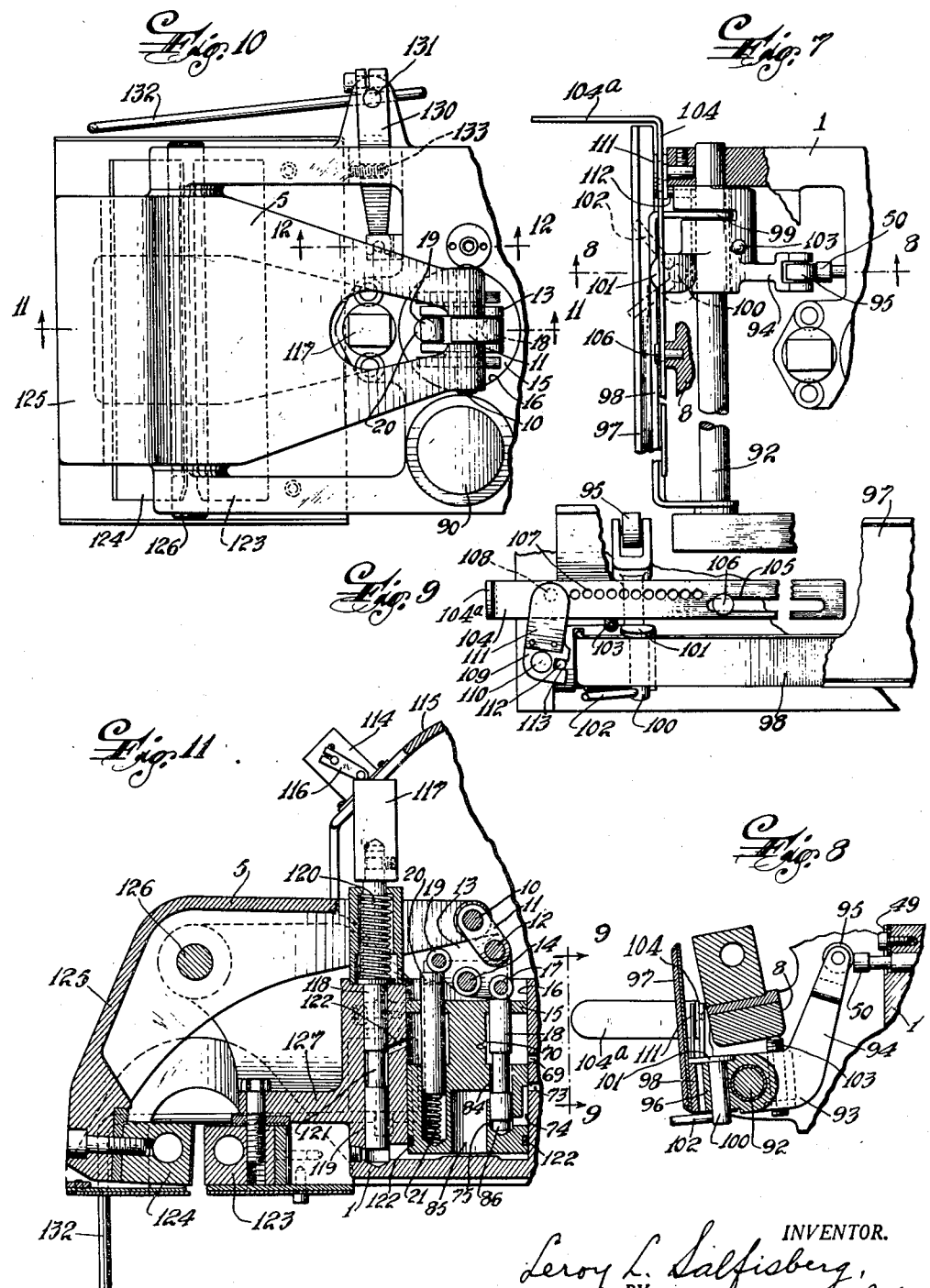

Patented July 19, 1949

2,476,629

UNITED STATES PATENT OFFICE 2,476,629

POWER-OPERATED HYDRAULIC SEALING
AND CRIMPING MACHINE

Leroy L. Salfisberg, South Orange, N. J., assignor to Seal-Craft, Incorporated, Newark, N. J., a corporation of New Jersey Application May 17, 1945, Serial No. 594,289

10 Claims. (Cl. 154—42)

1

This invention relates in general to a machine for pressing one or more layers of material into tight contact with another, and more particularly the invention contemplates mechanism for sealing together layers of packaging material for making or closing packages or for attaching labels or covers to the packages.

In general machines of this type are known, for example as disclosed in my patent United States Patent No. 2,140,117 dated December 13, 1938. The machine described in that patent includes a pair of jaws to receive and press layers of material between them, at least one jaw being initially actuated toward the other by the operator through a treadle-operated mechanism which starts a motor driven cam which then continues actuation of the movable jaw, until the treadle-operated mechanism is released, whereupon the cam stops at the end of a revolution.

In my copending application Serial No. 550,753, filed August 23, 1944, now Patent No. 2,402,298 dated June 18, 1946, I have disclosed a similar machine wherein the movable jaw initially is closed by the first portion of the movement of a treadle in one direction, the continuation of the movement of the treadle in said direction then operating a hydraulic pump the pressure from which is supplied to an operating piston which continues the closing of the jaws under high pressure.

One object of the present invention is to provide a machine of the general character described which shall include a novel and improved construction whereby the jaws shall be closed wholly by power driven mechanism.

Another object is to provide such a machine which shall embody novel and improved features of construction whereby the power driven mechanism may be started into operation by a simple manually operated starting mechanism, the jaws initially shall be closed under low hydraulic pressure and then automatically shall be completely closed and held closed for a predetermined period of time by higher hydraulic pressure.

A further object of the invention is to provide in a machine of this character novel and improved means such that if the operator's fingers or another object should be inserted accidentally between the jaws when the machine is manually started into operation, closing of the jaws will be prevented, and, due to the low hydraulic pressure then actuating the jaws, no substantial injury to the fingers of the operator, or the other object between the jaws, or to the machine can occur.

Still another object of the invention is to provide in a power driven hydraulic crimping or sealing machine of this character, novel and improved means for predetermining and regulating the duration of the period of application of high pressure to the jaws to accommodate different conditions of operation and different kinds of materials being operated upon.

2

A further object is to provide novel and improved hydraulically operated counting mechanism for registering the movement of the jaw-closing operations of the machine and which shall be so constructed and operated as to avoid miscount in case of accidental partial closing of the jaws, in other words shall not register a partial closing of the jaws.

A further object of the invention is to provide a machine of the specific character described which shall embody novel and improved features of construction whereby the major portion of the closing movement of the jaws shall be effected by relatively low hydraulic pressure and high hydraulic pressure shall be required for operating the jaws only during a minor portion of said closing thereof, to ensure economy in the use of power.

It is desirable, especially in machines for sealing or crimping packages, to utilize starting mechanism which will be more or less automatically actuated by manual movement of the package or other work into the space between the jaws, and accordingly another object of my invention is to provide novel and improved starting mechanism for machines of the general character described which can be actuated by movement of the operator's hands incident to the insertion of the package or work between the jaws and with a minimum of care and attention by the operator.

Other objects are to provide a machine for pressing or sealing layers of sheet material together which shall be simple, inexpensive and reliable in construction and operation; and to obtain other advantages and results that will be brought out by the following description in conjunction with the accompanying drawing in which Figure 1 is a top plan view of a crimping machine embodying my invention.

Figure 3 is a transverse vertical sectional view taken approximately on the line 3—3 of Figure 1.

Figure 4 is a fragmentary vertical longitudinal sectional view on the line 4—4 of Figure 1.

Figure 5 is a fragmentary horizontal sectional view approximately on the line 5—5 of Figure 2.

Figure 6 is a fragmentary vertical sectional view on the line 6—6 of Figure 1.

Figure 7 is a fragmentary horizontal sectional view approximately on the line 7—7 of Figure 2 with portions broken away and shown in section for clearness in illustration.

Figure 8 is a fragmentary vertical sectional view approximately on the plane of the line 8—8 of Figure 7.

Figure 9 is a fragmentary front elevational view of the machine viewed from the plane of the line 9—9 of Figure 8, with portions broken away for clearness in illustration.

Figure 10 is a view similar to Figure 1 showing a modification of the invention, wherein the jaws of the machine move toward and from each other in approximately a horizontal plane instead of in a vertical plane as shown in Figures 1 and 2.

Figure 11 is a vertical longitudinal sectional view on the plane of the line 11—11 of Figure 10, and Figure 12 is a fragmentary vertical sectional view approximately on the plane of the line 12—12 of Figure 10.

Figure 1:
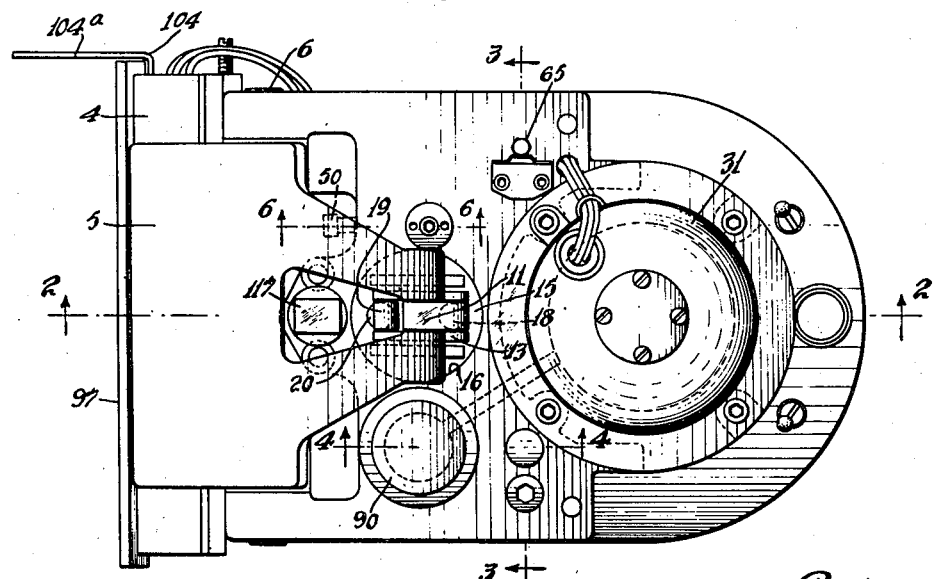

Specifically describing the invention, the reference character 1 designates the frame of the machine which may be a casting and is constructed to be set and fastened upon a table or like support. At the front of the frame is mounted a stationary jaw 3 which is shown in the form of an elongate bar of metal and cooperates with a jaw 4 which also constitutes an elongate bar of metal and is mounted on a lever or yoke 5 which is mounted to oscillate about a horizontal axis between its ends on the frame 1 so as to move the jaw 4 toward and from the jaw 3. As shown, the lever 5 is mounted on a shaft 6 which in turn is mounted in the frame 1. Desirably a plurality of shims 7 are interposed between the stationary jaw 3 and a horizontal cross bar 8 on the frame for the purpose of adjusting the jaw 3 relatively to the movable jaw, cap screws 9 being provided for removably securing the jaw 3 on the cross bar 8.

In accordance with the invention, the movable jaw 4 is actuated by power driven hydraulic mechanism and as shown, the end of the lever 5 opposite the jaw 4 is pivotally connected at 10 to one end of a toggle link 11 the other end of which is pivotally connected at 12 to a second toggle link 13 which is in the nature of a bell crank and is pivotally connected at 14 to the top of an operating piston 15 which is reciprocable in a cylinder 16 in the frame 1. The toggle link 13 also has mounted thereon a roller 17 normally resting upon the top of an auxiliary operating piston 18 which is reciprocable in the main operating piston 15.

At the side of the pivot 14 opposite the roller 17, the toggle link 13 has another roller 19 which normally abuts the top of a hollow cylindrical spring guide 20 which is slidable in the main operating piston and normally influenced outwardly thereof by a spring 21.

Figure 2:
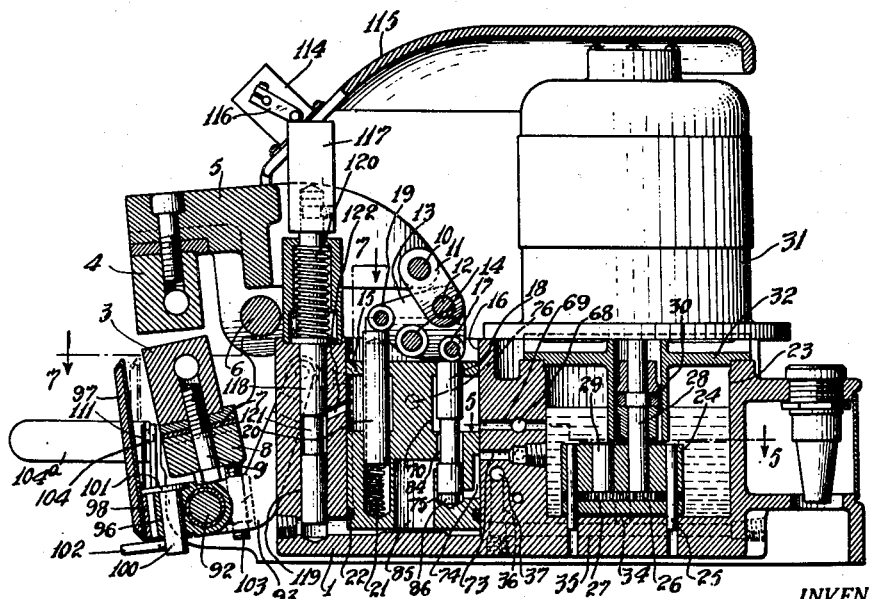
Figure 2 is a longitudinal vertical sectional view taken approximately on the plane of the line 2—2 of Figure 1.

With this construction, it will be observed that normally when no power is applied to the machine, the spring 21 acting on the roller 19 and through the toggle links 13 and 11 will swing the lever 5 into its upper position to open the jaws as shown in Figure 2, this movement being limited by engagement of the toggle link 13 with the top of the operating piston.

In accordance with the invention, to close the jaws, low hydraulic pressure is applied to the auxiliary operating piston 18 to force the same upwardly and thereby swing the toggle link 13 about the pivot 14 and through the link 11 swing the lever 5 so as to move the jaw 4 toward the stationary jaw 3. Assuming that there is no obstruction to closing of the jaws, hydraulic pressure is then applied to the main operating piston 15 so as to force the same upwardly and through the toggle links 13 and 11 apply high pressure to the movable jaw.

It will be observed that depending upon the thickness of the material being pressed between the jaws, the main operating piston will have a certain range of movement, the thicker the material the lower being the range of movement in the cylinder 16, and to provide adequate friction for holding the piston against slipping out of any particular range of movement, the piston has a friction ring 22 applied thereto.

Hydraulic pressure for operating the pistons 15 and 18 is generated in the machine, and for this purpose a reservoir 23 for liquid such as oil is provided in the frame 1. Mounted on the bottom of this reservoir is a pump 24 of any suitable construction for forcing the oil under pressure from the reservoir to the operating pistons. As shown, this pump is of the gear type and includes a casing secured on the bottom of the reservoir by pins 25 and having a pump chamber 26 in which are rotatable gears 27 that are mounted on the respective shafts 28 and 29 that project upwardly in the casing. As shown, the shaft 28 is coupled at 30 to the shaft of an electric motor 31 which is secured on the top plate 32 of the reservoir 23. The pump chamber 26 has an inlet passage 33 leading from the reservoir, and an outlet passage 34 which connects with a duct 35 bored in the cast frame 1 below the reservoir 23. The duct 35 communicates with a vertical duct 36 which in turn communicates with a horizontal passage 37 which near one end communicates with a horizontal duct 38 that leads to a cylinder 39 beneath a power piston 40 which normally is influenced downwardly in the cylinder or against the hydraulic pressure by a spring 41 (see Figure 4). The duct 38 also leads to the cylinder 42 of a piston valve 43 which normally is influenced downwardly by a spring 44, said valve normally closing the duct 38.

Also the horizontal passage 37 is connected by a vertical passage 45 with the cylinder 46 of the starting valve plunger 47 which normally is pressed outwardly of its cylinder by a spring 48 so as to close the passage 45 the outward movement of the valve plunger being limited by a stop plate 49 secured to the frame 1. The end of the valve plunger projects from the front of the frame and has a head 50 to cooperate with a starting device which will be hereinafter described. The starting valve 47 has a reduced portion 51 which normally opens the cylinder 46 to the upper end of a vertical passage 52, the other end of which communicates with a horizontal passage 53 that leads by a short port 54 into the lower end of the cylinder 55 of a control piston 56 which normally is influenced downwardly by a spring 57. Connecting the lower end of the cylinder 42 of the piston valve 43 with the cylinder 55 of the control piston 56 is a horizontal passage 58 and the control piston 56 has a transverse opening 59 which in one position of the piston alines with the passage 58 and constantly communicates with a central longitudinal opening 60 in the piston. The control piston 56 also has an annular groove 61 which in the normal position of the piston establishes communication between the passage 58 and a passage 62 which leads into the tapered port 63 of a timing valve which includes a needle or valve head 64 screw threaded at 65 in the frame 1 and adjustable in the port 63. The upper end of the timing valve port 63 leads into a chamber 66 which through a lateral port 67 communicates with the horizontal passage 37.

The cylinder of the starting valve 47 communicates through a port 91 with the cylinder 55 of the control piston 56 above the latter (see Figure 3). Said cylinder 55 above the piston 56 also communicates with one end of a horizontal passage 68 which intermediate its ends connects with a lateral duct 69 which leads to the cylinder 16 of the main piston and to the reservoir 23. In this connection, it will be noted that the main operating piston 15 has a deep circumferential groove 70 near its upper end with which the duct 69 normally communicates.

The passage 68 also communicates with the cylinder 42 of the piston valve 43 and said valve has a reduced portion 71 which normally establishes communication between the passage 68 and a short horizontal passage 72 which communicates through a duct 73 with a passage 74 formed between the main operating piston 15 and its cylinder wall and leading into a cylinder 75 beneath the auxiliary operating piston 18.

The circumferential groove 70 in the main operating piston also communicates through a duct 76 with the cylinder 46 of the starting piston 47 which has a reduced portion 77 normally establishing communication between said duct 76 and an air vent passage 79 which also normally communicates through the space around the reduced portion 51 of said valve with the passage 52, see Figure 6.

The reservoir 23 is also connected with the cylinder 39 of the power piston 40 through a duct 80 which normally is closed by said power piston. The power piston normally closes the port 80 but has its lower end reduced at 81 to form a shoulder 82 so that when the piston is raised a certain amount by the hydraulic pressure against the influence of the spring 41, the shoulder 82 will rise to a point which will establish communication between the port 80 and the space between the reduced portion 81 of the piston and the cylinder wall.

For convenience in filling the reservoir and the various passages, ducts and ports with liquid to the desired level, a filling opening 83 is provided and communicates with the passage 68 through the space between the reduced portion 71 of the piston valve 43 and its cylinder wall.

In operation of the machine as so far described when the motor 31 is operating, the parts normally are in the position shown in the drawings, the liquid under pressure being pumped through the passages 35, 36, 37 and 38 into the power piston cylinder 39 against the influence of the piston spring 41 so as to store up power. To close the jaws, the starting valve 47 is pushed inwardly sufficiently to establish communication between the passages 45 and 52 (see Figure 6) which permits the liquid to flow through passages 53 and 54 into the cylinder 55 below the control piston 56, which raises said piston so as to establish communication between the transverse opening 59 in the piston and the passage 58 (see Figure 3), liquid then flows from passage 58 through the longitudinal opening 60 in the valve 56 out of the upper end thereof into the upper end of the cylinder and thus through the passages 68 and 69 to the reservoir 23. This action releases the pressure under the piston valve 43 which descends and connects the pressure passage 38 with the passage 72 so that the fluid under pressure will flow through the passages 73 and 74 into the cylinder 75 below the auxiliary operating piston 18; said auxiliary operating piston thus is raised so as to actuate the toggle links 13 and 11, swing the lever 5 and move the jaw 4 toward the stationary jaw 3.

The piston 18 has a reduced portion 86 at its lower end, and the piston rises in its jaw-closing movement until said reduced portion establishes communication between the passage 74 and the recess 85 whereupon the hydraulic pressure is applied to the bottom of the main operating piston 15 which is thus forced upwardly to tightly close the jaws on the material between them. It will be noted that the cross sectional area of the auxiliary operating piston 18 is relatively small so that only low pressure is applied thereby to the jaws, and accordingly should an operator's fingers be inserted between the jaws during their initial closing movement, no serious injury would occur. Similarly, should an obstruction be interposed between the jaws during their closing no serious injury would occur to the mechanism.

Furthermore, it will be noted that should closing of the jaws be obstructed, the auxiliary piston 18 will not move far enough to establish communication between the passage 74 and the recess 85 so that hydraulic pressure will not be applied to the main operating piston and consequently the jaws will not be closed. This avoids any possibility of injury to operators or the machine. It will be observed, however, that the lower end of the main operating piston is relatively large so that when hydraulic pressure is applied thereto, the jaws will be closed under extremely high pressure.

The pressure applied to the jaws may be varied or regulated by rotating the cap 90 on the cylinder 39 of the power piston 40 so as to vary the compression of the spring 41. The high pressure will be maintained on the jaws for a period of time which is predetermined by the needle valve 64, the liquid escaping past said valve through the port 63 slowly or fast depending upon the position of said valve in said port. In the normal operation of the machine, when the machine is started, its control valve 47 is only momentarily pushed inwardly to establish communication between the passages 45 and 62, and upon release of the valve by the operator, the valve is returned by the spring 48 to its normal position as shown in Figure 6. In this position, the valve closes the passage 45 and opens the passage 52 to the atmosphere through the vent 79. The liquid will then flow through passage 76 to the chamber or groove 70 formed between the main operating piston and its cylinder and thus through passage 69 to the reservoir 23. The opening of passage 52 also opens passages 53 and 54 so that the flow of liquid therethrough permits the control piston 56 to descend into the position shown in Figure 3 so as to connect the timing valve port 63, the duct 62 and the passage 58 so that pressure beneath the piston 43 is increased and the piston is raised and closes the passage 38, at the same time establishing communication between the passages 72 and 68 around the reduced portion 71 of the valve piston, whereby the liquid flows to the reservoir 23. In this way the pressure beneath the main operating piston is reduced until the pressure beneath the auxiliary piston is overcome by the spring 21 whereupon the upper jaw is moved rapidly upwardly away from the lower jaw to open the jaws. It will be observed that the length of the period during which pressure is maintained on the jaws 3 and 4 may be predetermined and varied by the adjustment of the timing valve 64 to accommodate different conditions and different kinds of material to be operated upon.

In passing, it may be helpful to point out that the passage 91 is provided between the inner end of the starting valve cylinder 46 and the control valve cylinder 55 to drain off leakage.

As hereinabove indicated, the invention also includes manually actuated means for operating the starting valve 47, and the actuating means is shown as operated by the hands of the operator simultaneously with the insertion between the jaws of the material to be pressed.

This mechanism includes a horizontal shaft 92 journaled at the front end of the frame. Rotatably mounted on this shaft is a starting lever 93 which has one arm 94 provided with a roller 95 which normally abuts the projecting end of the starting valve 47. The lever has another arm 96 at the side of the shaft 92 opposite the arm 94 which may be separably connected to a combined operating and guard plate 97 which is carried by a U-shaped yoke 98 the ends 99 of which are rotatably mounted on the shaft 92.

The plate 97 is normally disposed in front of the stationary jaw 3 and has heat insulating properties so as to prevent the operator's fingers from coming into contact with and being burned by the hot jaw. In the arm 96 of the lever 93 is mounted a latch which includes a shank 100 rotatably mounted in the lever and having a head 101 at the upper end and an operating rod 102 at its lower end so that the latch may be connected to the yoke 98 as shown by solid lines in Figure 7 of the drawings or may be disconnected from said yoke as shown by dot and dash lines.

When the latch is connected to said yoke the lever 93 and the operating and shield plate 97 are connected to move together. Normally the lever 93 is held in the position shown in Figure 2 of the drawings by the spring 48 of the starting valve and the operating plate 97 is held in spaced relation to the stationary jaw, movement of the lever under the influence of the spring 48 being limited by the engagement of a stop screw 103 on the lever with the cross bar 8 on the frame.

In starting the machine, the operator grasps in his hands the material to be pressed between the jaws and simultaneously inserts said material between the jaws and with his knuckles pushes the operating plate 97 inwardly toward the stationary jaw. This action swings the lever 93 so as to push the starting valve 47 inwardly to open the passage 45 and 52 as hereinbefore described. Pressure on the operating plate is then released and the spring 48 returns the starting valve, the lever 93 and the plate 97 to their normal positions.

An alternative to the operating of the lever 93 by the plate 97 is also shown on the drawings and comprises an operating slide 104 one end of which has a slot 105 through which passes a guide pin 106 which is secured in the cross bar 8 while the other end has a plurality of openings 107 spaced longitudinally of the slide to selectively receive a pin 108 carried by one end of a lever 109 which is pivotally connected at 110 to the front of the main frame at one side thereof. Conveniently the pin 108 may be rigidly connected to the lever and the slide 104 may be held on the pin by a spring keeper strip 111 secured to the lever. The other end of the slide 104 is turned outwardly at 104a to be engaged by the hand of the operator. The lever 109 is operatively connected to the operating lever 93 by a pin 112 projecting from the operating lever and passing through a notch 113 in the actuating lever 109 so that as the slide 104 is reciprocated the operating lever 93 will be oscillated.

When using the slide 104 for starting the machine, the latch 100—102 is disconnected from the operating and shield plate 97 so that the latter may be moved independently of the lever 93. In starting the machine, the operator will insert between the jaws the material to be pressed and then press with his hand against the end 104a of the slide 104 so as to swing the actuating lever 109 and move the operating lever 93 to push the starting valve 47 inwardly and start the hydraulic mechanism.

As hereinbefore pointed out, the invention also contemplates the hydraulic action of a counter, and as shown in the drawings, a counter 114 of known construction is mounted on the cover plate 115 of the machine and has an actuating lever 116 which is engaged by the head 117 of a piston 118 that is vertically slidable in a cylinder 119 the lower end of which constantly communicates with the cylinder 16 of the main operating piston below the latter. The piston 118 normally is influenced downwardly by a spring 120 but each time the main operating piston is raised to close the jaws, the counter piston 118 is elevated to actuate the counter. Intermediate its ends the piston 118 has a reduced portion 121 which forms a space between the piston and cylinder which communicates through a duct 122 with the chamber 70 in the main piston to drain off leakage. It will be observed that the counter piston 118 will be operated only when liquid under pressure is admitted beneath the main cylinder to positively close the jaws, and that the counter will not be operated when the jaws are only partially closed under influence of the auxiliary operating piston 18. Accordingly there is no danger of a miscount which would occur if the counter were operated upon a partial closing of the jaws.

In the machine shown in Figures 1 to 9 inclusive, the jaws move toward and from each other in a substantially vertical plane, but it is also possible to arrange the jaws for operation in a horizontal plane so that the material to be pressed between the jaws may be inserted upwardly into the jaws and then automatically will drop from the jaws by action of gravity when the jaws are open.

Such a modification is shown in Figures 10 to 12 inclusive where the reference character 123 represents the stationary jaw and 124 indicates the movable jaw which is mounted on a yoke 125 similar to but differently shaped from the yoke or lever 5, said yoke 125 being pivoted on a shaft 126 in the main frame 127 of the machine. The hydraulic driving mechanism for closing the jaws and the operation thereof are identical in construction with that shown in Figures 1 to 6 inclusive and is designated by the same reference characters in Figures 10 to 12, except that a different starting valve is utilized and different operating mechanism therefor is provided.

As shown in Figure 12 the starting valve 128 has a pin and slot connection 129 with an actuating lever 130 pivotally mounted at 131 on a vertical axis of one side of the frame 127 and having an arm 132 disposed at one side of the frame adjacent the corresponding ends of the jaws so as to be conveniently engaged by the hand of the operator which is used to insert the material to be clamped between the jaws. The lever 130 normally is actuated by a spring 133 so as to push the starting valve 128 into its cylinder 134 and a stop screw 135 is mounted in the frame of the machine to engage a shoulder 136 on the valve to limit such movement. The valve has a cut away portion 137 to establish communication between the passages 45 and 52 when the valve is pulled outwardly by swinging of the lever 130, 132, and a second stop shoulder 138 is provided on the valve to engage the stop 135 to limit such outward movement of the valve. The operation of the valve otherwise is the same as that of the starting valve 47.

While I have shown and described the now preferred embodiment of my invention it should be understood that this is primarily for illustrating the principles of the invention, and that the invention may be embodied in other details of construction and in other types of hydraulically operated mechanisms within the spirit and scope of the invention.

What I claim is:

1. A machine for pressing material having relatively movable jaws to receive between them the material to be pressed and a mechanism for closing said jaws comprising main and auxiliary jaw-actuating means the latter of which is arranged to initially close said jaws under a light pressure while the first is arranged to thereafter continue the jaw-closing operation under relatively high pressure, said main means comprising a liquid-operated piston and cylinder device and said auxiliary means including a piston mounted in a cylinder in the piston of said main means, and cooperative portions on said main means and said auxiliary means comprising valve surfaces on the piston of said auxiliary means and passages in the piston of said main means for controlling application of fluid pressure to said main means, and means for controlling supply of fluid under pressure to said auxiliary means to actuate the latter.

2. The machine set forth in claim 1 with the addition of a counter, and a piston and cylinder device for actuating said counter and actuated by the same fluid pressure that drives said main piston so that said counter is actuated only when said main piston is moved in said direction to close said jaws.

3. The machine as defined in claim 1 with the addition of a source of supply of liquid under pressure and wherein the last-named means includes liquid passages between said source of supply and said auxiliary piston, and a starting valve for controlling flow of liquid from said source to said auxiliary piston.

4. The machine as defined in claim 1 with the addition of means for predetermining the duration of the period of application of liquid pressure to said main piston.

5. In a machine of the character described, a frame, a pair of jaws, a yoke carrying one of said jaws and pivotally mounted intermediate its ends on said frame, and mechanism for swinging said yoke to move the jaw thereon toward the other to close said jaws, comprising a main cylinder in said frame, a main piston reciprocable in said cylinder, a bell crank lever pivoted on the outer end of said piston and having one arm operatively connected to said yoke, an auxiliary cylinder in said main piston, an auxiliary piston in said auxiliary cylinder operatively engaging the other arm of said bell crank lever, so that upon movement of either of said pistons in one direction said yoke will be swung to close said jaws, means for controlling supply of liquid under pressure to said auxiliary cylinder to move said auxiliary piston in said direction and thereafter to supply liquid pressure to said main cylinder to operate said main piston in said direction.

6. In a machine of the character described, a frame, a pair of jaws, a yoke carrying one of said jaws and pivotally mounted intermediate its ends on said frame, and mechanism for swinging said yoke to move the jaw thereon toward the other to close said jaws, comprising a main cylinder in said frame, a main piston reciprocable in said cylinder, a bell crank lever pivoted on the outer end of said piston and having one arm operatively connected to said yoke, an auxiliary cylinder in said main piston, an auxiliary piston in said auxiliary cylinder operatively engaging the other arm of said bell crank lever so that upon movement of either of said pistons in one direction said yoke will be swung to close said jaws, means for controlling supply of liquid under pressure to said auxiliary cylinder to move said auxiliary piston in said direction, said main piston having passages leading from said auxiliary cylinder to said main cylinder and said auxiliary piston having portions cooperating with said passages normally to close them but to open them upon movement of said auxiliary piston to a predetermined point and permit liquid to flow into said main cylinder.

7. A machine as claimed in claim 1 with the addition of a friction ring between the piston of said main means and its cylinder for keeping said piston of the main means from slipping out of any given range of movement in accordance with the thickness of the material to be pressed.

8. A machine as claimed in claim 1 wherein said main and auxiliary jaw-actuating means include toggle linkage comprising a toggle link connected at one end to one of said jaws, and a bell crank lever connected to the other end of said toggle link and pivotally mounted on the piston of said main means and engaged by the piston of said auxiliary means, whereby operation of said auxiliary means moves the toggle linkage toward the position in which said linkage is straightened to initially close the jaws and subsequent operation of the main means applies pressure to said jaws through said toggle linkage with said linkage substantially in its straightened position.

9. A machine as claimed in claim 8 including a yoke pivotally mounted intermediate its ends, one end of said yoke carrying one of said jaws and the opposite end being connected to said toggle link.

10. A machine as claimed in claim 8 with the addition of spring means for influencing the piston of said auxiliary means in the other direction to open said jaws.

LEROY L. SALFISBERG.

REFERENCES CITED

The following references are of record in the file of this patent:

UNITED STATES PATENTS

| Number | Name | Date |
|---|---|---|
| 1,865,105 | Houplain | June 28, 1932 |
| 2,140,117 | Salfisberg | Dec. 13, 1938 |
| 2,169,036 | Bidwell | Aug. 8, 1939 |
| 2,305,010 | Kenney et al. | Dec. 15, 1942 |
| 2,388,877 | Souter | Nov. 13, 1945 |
| 2,402,298 | Salfisberg | June 18, 1946 |